US00RE46456E

(19) United States
(12) Reissued Patent
Katoh

(10) Patent Number: US RE46,456 E
(45) Date of Reissued Patent: Jun. 27, 2017

(54) IMAGE PROCESSING DEVICE, IMAGE PROCESSING METHOD, AND RECORDING MEDIUM

(71) Applicant: RICOH COMPANY, LTD., Ohta-ku (JP)

(72) Inventor: Katsuhiko Katoh, Fujisawa (JP)

(73) Assignee: RICOH COMPANY, LTD., Tokyo (JP)

(21) Appl. No.: 14/482,876

(22) Filed: Sep. 10, 2014

Related U.S. Patent Documents

Reissue of:
(64) Patent No.: 8,266,358
Issued: Sep. 11, 2012
Appl. No.: 12/404,436
Filed: Mar. 16, 2009

(30) Foreign Application Priority Data

Mar. 18, 2008 (JP) ..... 2008-069940
Nov. 12, 2008 (JP) ..... 2008-289732

(51) Int. Cl.
*G06F 13/24* (2006.01)
*G06F 1/32* (2006.01)
*G06F 1/00* (2006.01)

(52) U.S. Cl.
CPC ..... *G06F 1/3203* (2013.01); *G06F 1/325* (2013.01)

(58) Field of Classification Search
CPC ... G03G 15/5004; G06F 1/3203; G06F 1/325; B41L 13/06; H04N 1/00; H04M 19/08; Y02B 60/1267
USPC ..... 713/320, 324; 358/442; 710/260
See application file for complete search history.

(56) References Cited

U.S. PATENT DOCUMENTS 6,763,473 B1 * 7/2004 Oteki et al. ..... 713/324
6,822,764 B1 * 11/2004 Okabe et al. ..... 358/442
7,389,433 B2 * 6/2008 Sunagawa et al. ..... 713/320
7,624,215 B2 * 11/2009 Axford et al. ..... G06F 1/3203 710/260
8,032,769 B2 * 10/2011 Noda et al. ..... 713/320
(Continued)

FOREIGN PATENT DOCUMENTS

JP 9-81402 3/1997
JP 10-11411 1/1998
(Continued)

*Primary Examiner* — Christopher E. Lee
(74) *Attorney, Agent, or Firm* — Oblon, McClelland, Maier & Neustadt, L.L.P.

(57) ABSTRACT

An image processing device including a first control unit to control a normal operating mode during which image processing is performed, a second control unit to control an energy-saving mode during which power consumption is lower than during the normal operating mode, an interrupt request receiver connected to an external device to receive an interrupt request from the external device, interrupt factor distributors to distribute the interrupt request received by the interrupt request receiver based on whether or not the interrupt request includes a predetermined interrupt factor, interrupt request notification units to notify the second control unit as well as the first control unit of the interrupt request in accordance with distribution results from the interrupt factor distributors, and job adjustors to control transfer of a job between the first control unit and the second control unit based on notification from the interrupt request notification units.

8 Claims, 5 Drawing Sheets

(56) References Cited

U.S. PATENT DOCUMENTS

| | | | | |
|---|---|---|---|---|
| 8,069,357 | B2 * | 11/2011 | Nakamura et al. | 713/320 |
| 2007/0143514 | A1 * | 6/2007 | Kaushik et al. | 710/260 |
| 2007/0260358 | A1 | 11/2007 | Katoh | |
| 2008/0294921 | A1 * | 11/2008 | Hada | 713/323 |
| 2009/0031156 | A1 * | 1/2009 | Barth | 713/323 |
| 2009/0158068 | A1 * | 6/2009 | Pudipeddi et al. | 713/323 |

FOREIGN PATENT DOCUMENTS

| | | | | |
|---|---|---|---|---|
| JP | 2001-125880 | | 5/2001 | |
| JP | 2002-132393 | | 5/2002 | |
| JP | 2005-94679 | A * | 4/2005 | H04N 1/00 |
| JP | 2005-267097 | | 9/2005 | |

* cited by examiner

IMAGE PROCESSING DEVICE, IMAGE PROCESSING METHOD, AND RECORDING MEDIUM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present patent application is based on and claims priority pursuant to 35 U.S.C. §119 from Japanese Patent Application Nos. 2008-069940, filed on Mar. 18, 2008 in the Japan Patent Office, and 2008-289732, filed on Nov. 12, 2008 in the Japan Patent Office, the entire contents of each of which are incorporated herein by reference.

BACKGROUND OF THE INVENTION

1. Field of the Invention

Exemplary aspects of the present invention generally relate to image processing devices such as a digital printer, a scanner, a facsimile machine, and a digital multifunction printer having two or more of copying, printing, scanning, and facsimile functions, an image processing method employed in the image processing device, and a recording medium storing an image processing program.

2. Description of the Background

In order to satisfy demand for lower energy consumption, lower production cost, downsizing of devices, and so forth, image processing devices now generally employ application specific integrated circuits (ASICs) for input/output (I/O) control system such as universal serial bus (USB) and media access control (MAC). ASICs make it possible to control interrupt signals from a central processing unit (CPU), for example, and enable changes to be made to the wiring between elements on a chip.

Generally, the operating mode of the image processing device can be switched between a normal operating mode, in which image processing is performed, and an energy-saving mode, in which energy consumption is reduced as compared to the normal operating mode. In such an image processing device, multiple CPUs for handling interrupts depending on the operating mode may be included in the ASIC.

When receiving interrupt signals from multiple CPUs, the ASIC selects an interrupt signal sent from one of the CPUs to handle the interrupt signal thus selected. Consequently, interrupt factors in the other CPUs are deleted while the ASIC handles the interrupt signal thus selected, causing a system error and halt of the image processing device.

To solve such problems, Published Unexamined Japanese Patent Application No. (hereinafter referred to as JP-A-) H10-011411 discloses a multiprocessor system in which destinations to notify multiple interrupt generation factors are not fixed, but are instead dynamically changeable.

Another approach is disclosed in JP-A-H09-081402, in which a processor to receive an interrupt from a data transfer processing device can be changed by software, such that a multiprocessor system including an interrupt destination control means with a higher degree of freedom can be achieved.

Yet another approach is disclosed in JP-A-2001-125880, in which, in a multiprocessor system, an interrupt from a particular processor is handled first according to a priority level of interrupts sent from an I/O control system.

However, in the above-described multiprocessor systems of the related-art, when an interrupt is received at the same time the operating mode of the image processing device is switched, a large lag arises between a time when the interrupt is generated and a time when the interrupt is reported. Consequently, the interrupt cannot be properly handled.

Specifically, in a case in which CPUs for handling interrupts are switched depending on the operating mode of the image processing device, an interrupt control wire on a peripheral component interconnect (PCI) bus is used in one of the CPUs whereas a local interrupt control wire is used in the other CPU. Consequently, a difference in communication speed between the CPUs causes the large difference between the time of generation of the interrupt and the time of notification of the interrupt. As a result, the interrupt is not properly handled.

Further, because the CPUs are turned on and off via a chip set in the related-art image processing device, in a case in which the operating mode of the image processing device is changed to the normal operating mode using a weekly timer or the like in the chip set, the image processing device enters a Suspend-to-RAM mode, in which data in the CPUs is temporarily saved in a memory, again after the CPUs are turned on.

SUMMARY

In view of the foregoing, illustrative embodiments of the present invention provide an image processing device capable of smoothly handling interrupts even when an operating mode of the image processing device is switched at the same time an interrupt signal is received. Further, the image processing device prevents the operating mode thereof from being switched to a Suspend-to-RAM mode again after a CPU is turned on. Illustrative embodiments of the present invention further provide an image processing method employed in the image processing device, and a recording medium storing an image processing program.

In one illustrative embodiment, an image processing device includes a first control unit to control a normal operating mode during which image processing is performed, a second control unit to control an energy-saving mode during which power consumption is lower than during the normal operating mode, an interrupt request receiver connected to an external device to receive an interrupt request from the external device, interrupt factor distributors to distribute the interrupt request received by the interrupt request receiver based on whether or not the interrupt request includes a predetermined interrupt factor, interrupt request notification units to notify the second control unit as well as the first control unit of the interrupt request in accordance with distribution results from the interrupt factor distributors, and job adjustors to control transfer of a job between the first control unit and the second control unit based on notification from the interrupt request notification units.

Another illustrative embodiment provides an image processing method for an image processing device including a first control unit to control a normal operating mode during which image processing is performed and a second control unit to control an energy-saving mode during which power consumption is lower than during the normal operating mode. The image processing method includes receiving an interrupt request from an external device connected to the image processing device, distributing the interrupt request based on whether or not the interrupt request includes a predetermined interrupt factor, notifying the second control unit as well as the first control unit of the interrupt request in accordance with distribution results obtained by the distributing the interrupt request; and controlling transfer of a job between the first control unit and the second control unit based on notification from the notifying.

Another illustrative embodiment provides a recording medium storing an image processing program including modules that causes an image processing device including a first control unit to control a normal operating mode during which image processing is performed and a second control unit to control an energy-saving mode during which power consumption is lower than during the normal operating mode to execute an image processing method. The image processing method includes receiving an interrupt request from an external device connected to the image processing device, distributing the interrupt request based on whether or not the interrupt request includes a predetermined interrupt factor, notifying the second control unit as well as the first control unit of the interrupt request in accordance with distribution results obtained by the distributing the interrupt request, and controlling transfer of a job between the first control unit and the second control unit based on notification from the notifying.

Additional features and advantages of the present invention will be more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1:
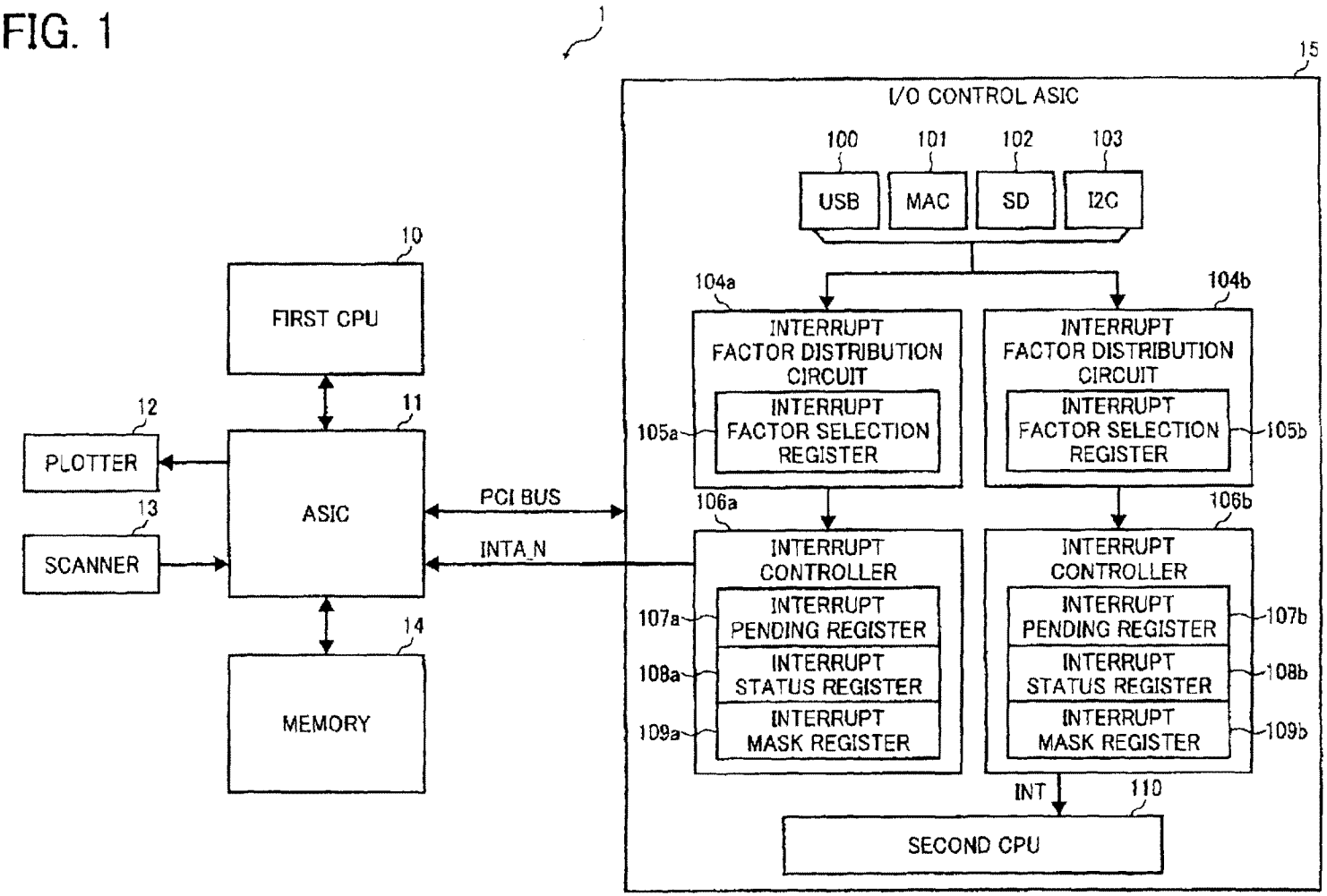
FIG. 1 is a block diagram illustrating a configuration of an image processing device according to a first illustrative embodiment.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

FIG. 1 is a block diagram illustrating a configuration of an image processing device 1 according to a first illustrative embodiment.

Referring to FIG. 1, the image processing device 1 includes a first CPU 10, an ASIC 11, a plotter 12, a scanner 13, a memory 14, and an I/O control ASIC 15.

The I/O control ASIC 15 includes a universal serial bus (USB) 100, a media access control (MAC) 101, a secure digital (SD) 102, an inter integrated circuit (I2C) 103, interrupt factor distribution circuits 104a and 104b, interrupt controllers 106a and 106b, and a second CPU 110.

The interrupt factor distribution circuits 104a and 104b include interrupt factor selection registers 105a and 105b, respectively.

The interrupt controllers 106a and 106b include interrupt pending registers 107a and 107b, interrupt status registers 108a and 108b, and interrupt mask registers 109a and 109b, respectively.

The first CPU 10 and the ASIC 11 are connected to each other via a bus line. The first CPU 10 controls each component to store image data read by the scanner 13 in the memory 14 and transfer the image data stored in the memory 14 to the plotter 12 to output the image data.

The ASIC 11 is connected to the first CPU 10, the plotter 12, the scanner 13, and the memory 14. The ASIC 11 is further connected to the I/O control ASIC 15 via a PCI bus. The ASIC 11 receives and controls interrupt signals sent from the first CPU 10 and the interrupt controller 106a.

The plotter 12 outputs the image data stored in the memory 14 onto a sheet-like or other recording medium.

The scanner 13 directs light onto a document to optically read image data on the document, and acquires image data of three colors of red, green, and blue from the image data thus read. The image data of the three colors thus acquired is transferred to the memory 14 via the ASIC 11 and stored in the memory 14 under control of the first CPU 10.

The memory 14 stores the image data transferred from the scanner 13. The memory 14 may be implemented as a flash memory, a random access memory (RAM), or an erasable programmable read only memory (EPROM) and an electrically erasable-programmable read only memory (EEPROM) capable of rewriting data.

The second CPU 110 is not included in a related-art I/O control ASIC. In order to save a large amount of power consumed by the first CPU 10 and the ASIC 11 while the image processing device 1 is in a waiting mode, the I/O control ASIC 15 includes the second CPU 110 so that power is not supplied to the first CPU 10 and the ASIC 11 during the waiting mode.

The second CPU 110 communicates with external devices to determine whether to turn the first CPU 10 and the ASIC 11 on or off in order to save power during an energy-saving mode.

The USB 100 serves as a port to attach a USB device, not shown, to the image processing device 1. Data input from the USB device is received by the USB 100.

The MAC 101 performs data transmission when data is sent and received from a local area network (LAN) or a wide area network (WAN) to a bus cable. Specifically, the data from the network is received by the MAC 101.

The SD 102 includes a slot, and receives data from an SD memory card inserted thereinto by a user.

The I2C 103 performs data transmission when data is sent and received from external devices such as an audio device or a digital camera to the bus cable using a signal line serial clock (SCL) and signal line serial data (SDA). Specifically, the data from the external devices is received by the I2C 103.

When the USB 100, the MAC 101, the SD 102, or the I2C 103 receives data from external devices, the I/O control ASIC 15 sends an interrupt signal to the interrupt factor distribution circuits 104a and 104b to transfer the data.

An interrupt factor distribution circuit is provided for each CPU. Specifically, according to the first illustrative embodiment, the interrupt factor distribution circuit 104a is provided for the first CPU 10, and the interrupt factor distribution circuit 104b is provided for the second CPU 110. The interrupt factor distribution circuits 104a and 104b are connected to the interrupt controllers 106a and 106b, respectively.

It is to be noted that, although provided in the I/O control ASIC 15 according to the first illustrative embodiment, it is not necessary that the second CPU 110 be so disposed. Alternatively, the second CPU 110 may be connected to the I/O control ASIC 15 via a local bus of the second CPU 110.

The interrupt pending registers 107a and 107b display all interrupt factors generated at that time regardless of whether or not the interrupt factors are masked by the interrupt mask registers 109a and 109b.

The interrupt status registers 108a and 108b cause interrupt factors masked by the interrupt mask registers 109a and 109b to be not displayed.

The interrupt mask registers 109a and 109b mask interrupt factors.

The interrupt pending registers 107a and 107b, the interrupt status registers 108a and 108b, and the interrupt mask registers 109a and 109b are independently included in the interrupt controller 106a and 106b, respectively. For example, the first CPU 10 does not reference the registers in the interrupt controller 106b, and does not change values in the interrupt controller 106b. Similarly, the second CPU 110 does not reference the registers in the interrupt controller 106a, and does not change values in the interrupt controller 106a.

Interrupt factors are preset in the interrupt factor selection registers 105a and 105b respectively provided in the interrupt factor distribution circuits 104a and 104b. When receiving an interrupt signal from the external device of the I/O control ASIC 15, the interrupt factor distribution circuits 104a and 104b determine whether or not the interrupt signal corresponds to the interrupt factors already written in the interrupt factor selection registers 105a and 105b, respectively. When the interrupt signal corresponds to the interrupt factor written in the interrupt factor selection registers 105a and 105b, the interrupt factor distribution circuits 104a and 104b send the interrupt signal to the interrupt controller 106a and 106b, respectively.

Each of the interrupt factor selection registers 105a and 105b is configured such that a result determined by one of the interrupt factor selection registers 105a and 105b does not affect the other interrupt factor selection register.

In a case in which an interrupt signal from the USB 100, the MAC 101, the SD 102, or the I2C 103 is controlled by the first CPU 10 when the image processing device 1 is in a normal operating mode, the interrupt factor selection register 105a in the interrupt factor distribution circuit 104a is set such that the interrupt signal is sent to the first CPU 10. In addition, the interrupt factor selection register 105b in the interrupt factor distribution circuit 104b is set such that the interrupt signal is not sent to the second CPU 110.

In a case in which the interrupt signal is not handled by the first CPU 10 for a certain period of time and that causes a system error, a value in the interrupt factor selection register 105b in the interrupt factor selection circuit 104b for the second CPU 110 is set such that the interrupt signal is sent to the second CPU 110.

Each of the first CPU 10 and the second CPU 110 includes a register identical to that for the other CPU in an external device in order to clear interrupt factors when receiving interrupt signals. Accordingly, the interrupt factors in a function generating the interrupt signals are cleared in a certain period of time. At the same time, the interrupt controller 106a outputs a disable signal to the interrupt mask register 109a to disable the interrupt mask register 109a. When an interrupt signal is generated, the interrupt controller 106a outputs an INTA_N signal to the ASIC 11 via the PCI bus to notify the first CPU 10 of generation of interrupt.

Thus, in a case in which the interrupt signal is not handled by the first CPU 10 for a certain period of time and that causes a system error, the interrupt factor selection register 105b in the interrupt factor distribution circuit 104b for the second CPU 110 sends the interrupt signal to the second CPU 110. Accordingly, the interrupt factor in the function generating the interrupt signal is cleared in a certain period of time.

Figure 2:
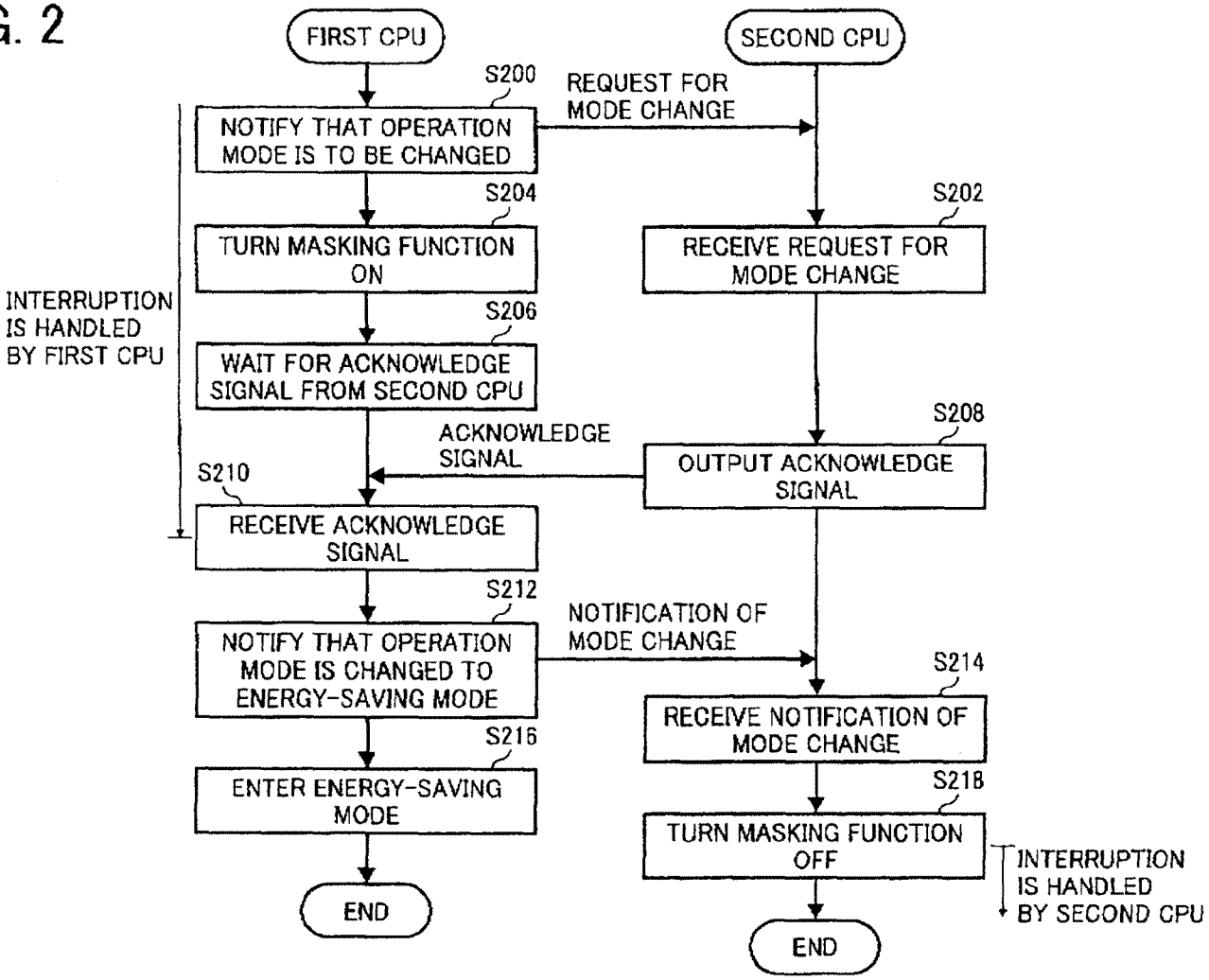
FIG. 2 is a flowchart illustrating processes performed by the image processing device to change an operating mode thereof from a normal operating mode to an energy-saving mode and switch CPUs for handling interrupts during the normal operating mode.

FIG. 2 is a flowchart illustrating processes performed by the image processing device 1 according to the first illustrative embodiment to change the operating mode thereof from the normal operating mode to the energy-saving mode and switch the CPUs for handling interrupts during the normal operating mode.

At S200, the first CPU 10 notifies the second CPU 110 that the operating mode of the image processing device 1 is to be changed. At S202, the second CPU 110 receives a request to change the operating mode of the image processing device 1 sent from the first CPU 10, and prepares for changing the operating mode. At S204, the first CPU 10 controls such that the interrupt mask register 109a in the interrupt controller 106a masks interrupt factors in functions of which control is to be switched. At S206, the first CPU 10 waits for an acknowledge signal to be sent from the second CPU 110. When the preparation for changing the operating mode is completed, at S208, the second CPU 110 sends the acknowledge signal to the first CPU 10. At this time, an interrupt may be generated while masking is performed under control of the first CPU 10. In such a case, the first CPU 10 handles the interrupt thus generated. Thereafter, at S210, the first CPU 10 receives the acknowledge signal from the second CPU 110. At S212, the first CPU 10 notifies the second CPU 110 that the operating mode of the image processing device 1 is changed to the energy-saving mode, and at S216, controls the image processing device 1 to enter the energy-saving mode.

Meanwhile, at S214, the second CPU 110 receives the notification that the operating mode is changed to the energy-saving mode from the first CPU 10. Thereafter, at S218, the second CPU 110 causes the interrupt mask register 109b of the interrupt controller 106b to release masking of interrupt factors in corresponding functions. As a result, interrupts can be properly handled by the second CPU 110. After S218, the second CPU 110 handles interrupts generated in functions.

As illustrated in FIG. 2, the first CPU 10 handles the interrupts from S200 to S210. From S212 to S216, both the first CPU 10 and the second CPU 110 handle the interrupts. In processes after S216, the second CPU 110 handles the interrupts.

As described above, according to the first illustrative embodiment, the image processing device 1 receives an interrupt request from the external device connected to the image processing device 1. The interrupt request thus received is distributed depending on whether or not a predetermined interrupt factor is included in the interrupt request. The interrupt controllers 106a and 106b simultaneously notify the first CPU 10 operating during the normal operating mode and the second CPU 110 operating during the energy-saving mode of the interrupt request based on the interrupt factor. Accordingly, in a case in which the interrupt signal is received at the same time when the operating mode of the image processing device 1 is switched, the interrupt can be smoothly handled. Specifically, the CPU for handling interrupts can be reliably determined between the first CPU 10 and the second CPU 110 based on the interrupt request sent from the interrupt controllers 106a and 106b.

The interrupt signal from the MAC 101 during the energy-saving mode is sent to the second CPU 110 so that the MAC 101 is controlled by the second CPU 110. As a result, the interrupt signal is simultaneously reported to both the first CPU 10 and the second CPU 110 so that a job performed by one of the first CPU 10 and the second CPU 110 can be monitored by the other CPU. When the job is not handled in a certain period of time, such a state is recognized as an error by the other CPU and an error signal is generated by the other CPU.

Figure 3:
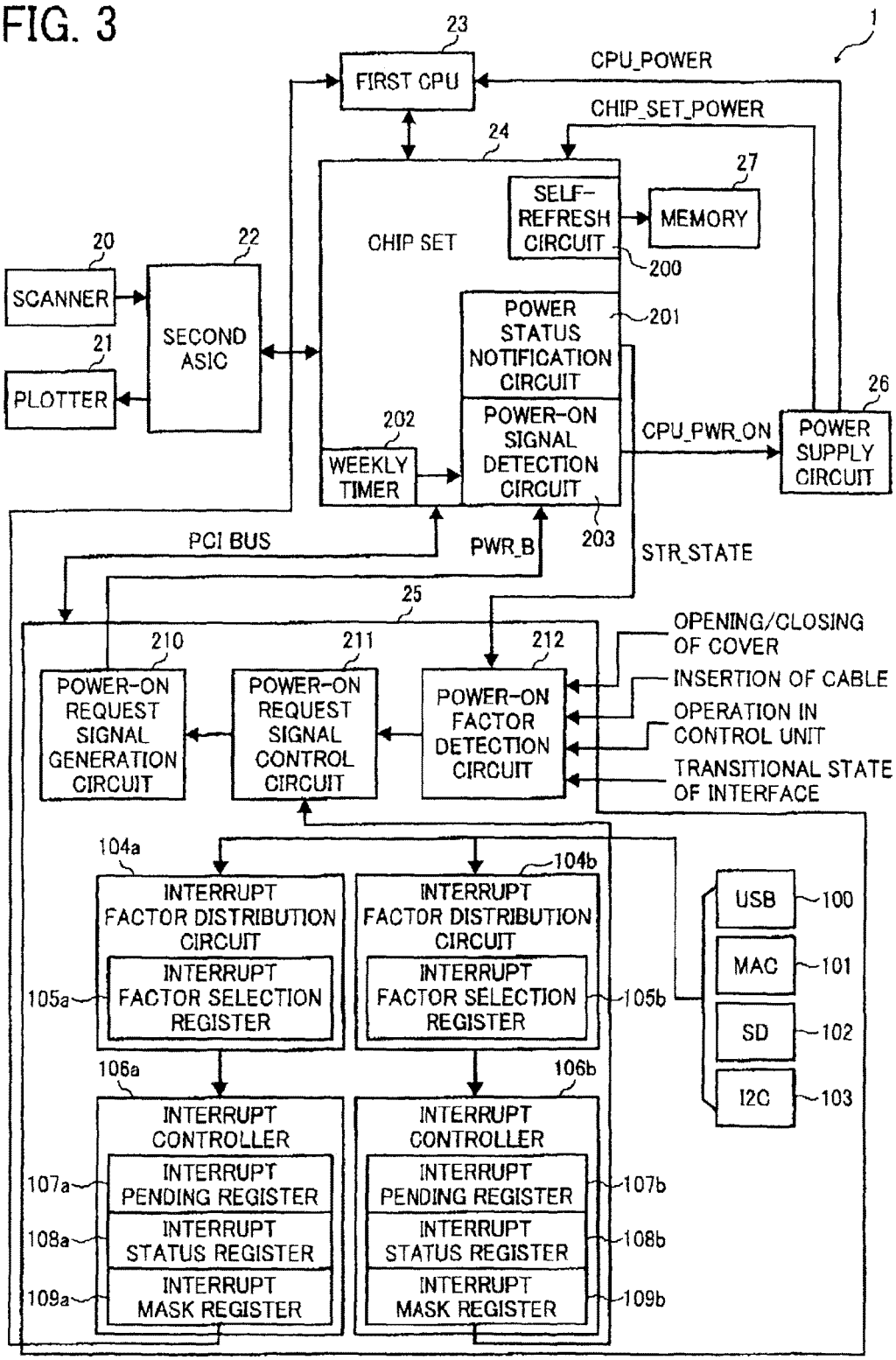
FIG. 3 is a block diagram illustrating a configuration of an image processing device according to a second illustrative embodiment.

FIG. 3 is a block diagram illustrating a configuration of the image processing device 1 according to a second illustrative embodiment.

Referring to FIG. 3, the image processing device 1 includes a scanner 20, a plotter 21, a second ASIC 22, a first CPU 23, a chip set 24, a first ASIC 25, a power supply circuit 26, and a memory 27. Specifically, the first ASIC 25 corresponds to the I/O control ASIC 15 illustrated in FIG. 1, and includes the interrupt factor distribution circuits 104a and 104b and the interrupt controllers 106a and 106b, each of which is illustrated in FIG. 1. The first ASIC 25 further includes a power-on request signal generation circuit 210, a power-on request signal control circuit 211, and a power-on factor detection circuit 212.

The chip set 24 includes a self-refresh circuit 200, a power status notification circuit 201, a weekly timer 202, and a power-on signal detection circuit 203.

In the image processing device 1 according to the second illustrative embodiment, power is turned on and off under control of the first ASIC 25. However, only the first CPU 23 is turned on and off under control of the chip set 24.

While the image processing device 1 is in the energy-saving mode, the chip set 24 causes data in the first CPU 23 to be temporarily saved in the memory 27 such that the first CPU 23 enters a Suspend-to-RAM mode, and turns the first CPU 23 off. At this time, in a similar manner as the case of the first illustrative embodiment, the image processing device 1 receives the interrupt signal from the external device connected to the image processing device 1. The interrupt signal is distributed depending on whether or not a predetermined interrupt factor is included in the interrupt signal.

The interrupt controllers 106a and 106b simultaneously notify the first CPU 23 operating during the normal operating mode and the power-on request signal control circuit 211 which controls power during the energy-saving mode of the interrupt signal based on the interrupt factor.

Accordingly, in a case in which the interrupt signal is received at the same time the operating mode of the image processing device 1 is switched, the interrupt signal can be smoothly handled.

As illustrated in FIG. 3, the first ASIC 25 does not include a CPU, but instead includes the power-on request signal control circuit 211.

When an event to return the operating mode from the energy-saving mode to the normal operating mode (hereinafter referred to as a recovery event) is generated in the image processing device 1 having the above-described configuration, one possible operation performed by the power-on request signal control circuit 211 in order to immediately return the operating mode of the image processing device 1 from the energy-saving mode to the normal operating mode is to cause the power-on request signal generation circuit 210 to generate a power-on request signal (PWR_B signal). However, if the first CPU 23 is turned on while an operation to turn the first CPU 23 off is performed, the first CPU 23 may not be properly tuned on. Further, because the recovery event from the external device is not generated in synchronization with a state of the image processing device 1, the recovery event may be generated while the operating mode of the image processing device 1 is changed to the energy-saving mode. In addition, because the recovery event is instantaneously generated, the recovery event may not be always asserted by a level signal.

To solve such problems, in the image processing device 1 according to the second illustrative embodiment, the interrupt controller 106b detects the recovery event even when the operating mode of the image processing device 1 is in the middle of being changed to the energy-saving mode, and the power-on request signal control circuit 211 generates the PWR_B signal via the power-on request signal generation circuit 210 after the first CPU 23 is turned off. Accordingly, the operating mode of the image processing device 1 is properly returned to the normal operating mode regardless of the state of the image processing device 1 when the recovery event is generated.

When the chip set 24 turns the first CPU 23 off, the power status notification circuit 201 outputs an STR_State signal to the power-on factor detection circuit 212.

The chip set 24 receives the PWR_B signal from the power-on request signal generation circuit 210 in the first ASIC 25, and turns the first CPU 23 on based on the PWR_B signal.

The first ASIC 25 and a part of the circuits in the chip set 24 are turned on during the Suspend-to-RAM mode. Specifically, the circuits other than the self-refresh circuit 200 relating to the Suspend-to-RAM mode in the chip set 24 and other devices on the board are turned off during the Suspend-to-RAM mode. The first ASIC 25 directly controls power on and off of the other devices.

When a user presses a start button, not shown, to turn the image processing device 1 on, the first ASIC 25 outputs the PWR_B signal, which is a power-on request signal for the first CPU 23, to the chip set 24 while turning the other devices on. The chip set 24 turns the first CPU 23 on in response to the PWR_B signal, so that the image processing device 1 enters the normal operating mode.

When the image processing device 1 enters the energy-saving mode, the chip set 24 turns the first CPU 23 off, and the power status notification circuit 201 outputs an STR_State signal "L" to the power-on factor detection circuit 212. Thereafter, the chip set 24 enters the Suspend-to-RAM mode.

An example of requirements for the chip set 24 to return to the normal operating mode from the Suspend-to-RAM mode includes input of events generated in the chip set 24 such as a power recovery factor generated depending on whether or not the weekly timer 202 reaches a predetermined time, or the power-on request signal (PWR_B signal) from the first ASIC 25.

The first ASIC 25 outputs the PWR_B signal through the power-on request signal generation circuit 210 when, for example, detecting events such as opening/closing of a cover, insertion of a cable, an operation in a control unit, transitional state of interfaces, and so forth, as a power recovery factor.

The power recovery factors described above are just examples, and detection of other events may cause the first ASIC 25 to output the PWR_B signal through the power-on request signal generation circuit 210. When detecting such events, the first ASIC 25 enters the energy-saving mode from the normal operating mode. During the energy-saving mode, input/output devices are turned off and an operation of an internal clock is stopped to reduce energy consumption.

A description is now given of how the operating mode of the chip set 24 is returned from the Suspend-to-RAM mode to the normal operating mode by the power recovery factor detected by the first ASIC 25.

When detecting the power recovery factor, the power-on factor detection circuit 212 of the first ASIC 25 notifies the power-on request signal control circuit 211 of detection of a power-on request event. Subsequently, the power-on request signal control circuit 211 compares the power-on request event thus reported with a value preset in each register to determine whether or not the power-on request event is a factor for driving the power-on request signal generation circuit 210. When the power-on request event is a factor for driving the power-on request signal generation circuit 210, the power-on request signal generation circuit 210 outputs the PWR_B signal as the power-on request signal to the chip set 24. Accordingly, the chip set 24 turns the first CPU 23 on in response to the PWR_B signal from the first ASIC 25. Specifically, when receiving the PWR_B signal, the chip set 24 outputs a CPU_PWR_on signal to the power supply circuit 26, so that the power supply circuit 26 starts supplying power to the first CPU 23 and the circuits in the chip set 24 which are turned off.

A description is now given of how the chip set 24 is returned to the normal operating mode from the Suspend-to-RAM mode by events generated within the chip set 24 such as the weekly timer 202.

When the weekly timer 202 reaches a predetermined time, the chip set 24 outputs a startup signal to the power-on signal detection circuit 203. When detecting the startup signal, the power-on signal detection circuit 203 outputs the CPU_PWR_on signal to the power supply circuit 26 so that the power supply circuit 26 starts supplying power to the first CPU 23 and the circuits in the chip set 24 which are turned off.

As described above, because the chip set 24 changes the operating mode thereof from the Suspend-to-RAM mode to the normal operating mode in response to an event generated within the chip set 24, the power status notification circuit 201 in the chip set 24 outputs the STR_State signal to notify the first ASIC 25 of return to the normal operating mode.

When the first ASIC 25 detects generation of the event based on the STR_State signal, the power-on factor detection circuit 212 detects the generation of the event based on the STR_State signal and notifies the power-on request signal control circuit 211 of such detection to return the operating mode of the first ASIC 25 from the energy-saving mode to the normal operating mode.

The event thus reported based on the STR_State signal is not registered as a power-on request signal generation factor in a register in the power-on request signal control circuit 211. As a result, the power-on request signal control circuit 211 does not output the power-on request signal (PWR_B signal) to the chip set 24 through the power-on request signal generation circuit 210, so that only power control signals for the other devices on the board can be controlled.

Figure 4:
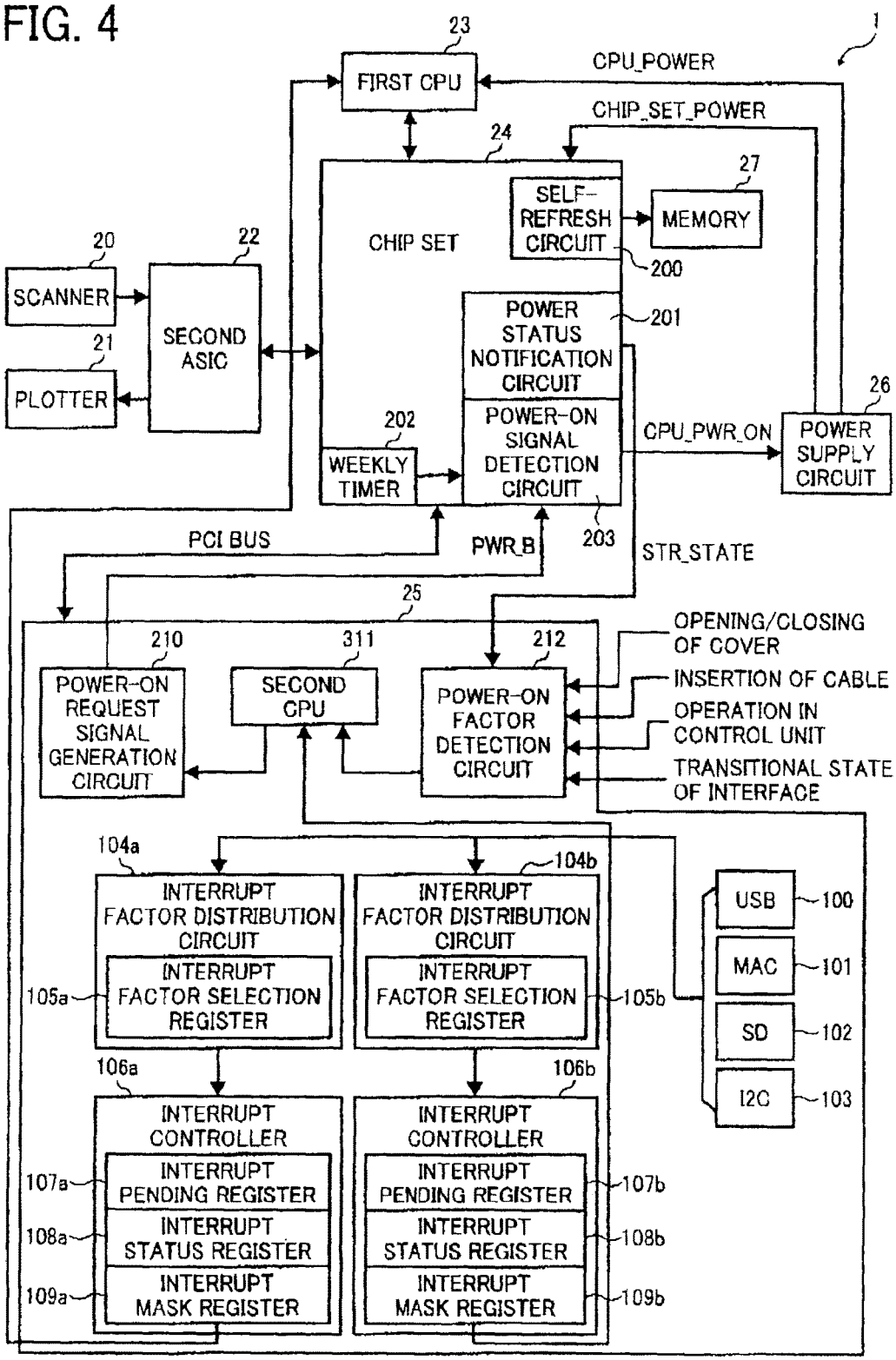
FIG. 4 is a block diagram illustrating a configuration of an image processing device according to a third illustrative embodiment.

FIG. 4 is a block diagram illustrating a configuration of the image processing device 1 according to a third illustrative embodiment.

Referring to FIG. 4, the image processing device 1 includes the scanner 20, the plotter 21, the second ASIC 22, the first CPU 23, the chip set 24, the first ASIC 25, the power supply circuit 26, and the memory 27.

The chip set 24 includes the self-refresh circuit 200, the power status notification circuit 201, the weekly timer 202, and the power-on signal detection circuit 203.

The first ASIC 25 includes the power-on request signal generation circuit 210, a second CPU 311, and the power-on factor detection circuit 212.

The difference between the second illustrative embodiment and the present third illustrative embodiment is that the image processing device 1 includes the second CPU 311. In the third illustrative embodiment, the first ASIC 25 corresponds to the I/O control ASIC 15 illustrated in FIG. 1, and includes the interrupt factor distribution circuits 104a and 104b, and the interrupt controllers 106a and 106b.

The second CPU 311 functions as the power-on request signal control circuit 211 in the second illustrative embodiment. The second CPU 311 can obtain the factors detected by the power-on factor detection circuit 212, and directly controls the power-on request signal generation circuit 210.

A description is now given of how the chip set 24 is returned to the normal operating mode from the Suspend-to-RAM mode based on a factor generated within the weekly timer 202.

When the power-on signal detection circuit 203 detects the startup signal sent from the weekly timer 202, the chip set 24 outputs the CPU_PWR_on signal to the power supply circuit 26. Accordingly, the power supply circuit 26 starts supplying power to the first CPU 23 and the circuits in the chip set 24 which are turned off.

At this time, in a similar manner as the case of the first illustrative embodiment, the image processing device 1 receives the interrupt signal from the external device connected to the image processing device 1. The interrupt signal is distributed depending on whether or not a predetermined interrupt factor is included in the interrupt signal.

The interrupt controllers 106a and 106b simultaneously notify the first CPU 23 operating during the normal operating mode and the second CPU 311 operating during the energy-saving mode of the interrupt signal based on the interrupt factor. Accordingly, in a case in which the interrupt signal is received at the same time the operating mode of the image processing device 1 is switched, the interrupt can be smoothly handled.

During the energy-saving mode, the interrupt signal from the MAC 101 is sent to the second CPU 311 so that the second CPU 311 controls the MAC 101. Accordingly, the interrupt signal is reported to both the first CPU 23 and the second CPU 311 at the same time so that each of the first and second CPUs 23 and 311 can monitor a job performed by the other CPU. When the job is not handled for a certain period of time, such a state is recognized as an error by the other CPU and the error signal is generated by the other CPU.

Because the chip set 24 changes the operating mode thereof from the Suspend-to-RAM mode to the normal operating mode in response to an event generated within the chip set 24, the power status notification circuit 201 in the chip set 24 outputs the STR_State signal to the power-on factor detection circuit 212. When receiving the STR_State signal, the power-on factor detection circuit 212 in the first ASIC 25 detects generation of the event based on the STR_State signal. As a result, the first ASIC 25 returns the operating mode thereof from the energy-saving mode to the normal operating mode.

The power-on factor detection circuit 212 notifies the second CPU 311 of detection of the event based on the STR_State signal. The second CPU 311 detects the power-on factor based on the event thus reported and recognizes the power-on factor as the STR_State signal which is a power recovery factor generated within the chip set 24. Accordingly, the second CPU 311 does not output the power-on signal (the PWR_B signal) to the chip set 24 via the power-on request signal generation circuit 210, but instead controls power control signals for other devices on the board.

As described above, according to the third illustrative embodiment, the first ASIC 25 controls generation of the power-on signal to the chip set 24 based on whether or not the recovery event is generated within the chip set 24. Accordingly, the first ASIC 25 does not output the power-on signal (PWR_B signal) to the chip set 24, but instead controls the power control signals for other devices on the board. As a result, the chip set 24 can be prevented from returning to the Suspend-to-RAM mode again after the first CPU 23 is turned on.

A description is now given of sequences of the signals for returning the chip set 24 from the energy-saving mode to the normal operating mode and the power-on request signal when the recovery event is detected in the image processing device 1 according to the second and the third illustrative embodiments illustrated in FIGS. 3 and 4 during the energy-saving mode.

Figure 5:
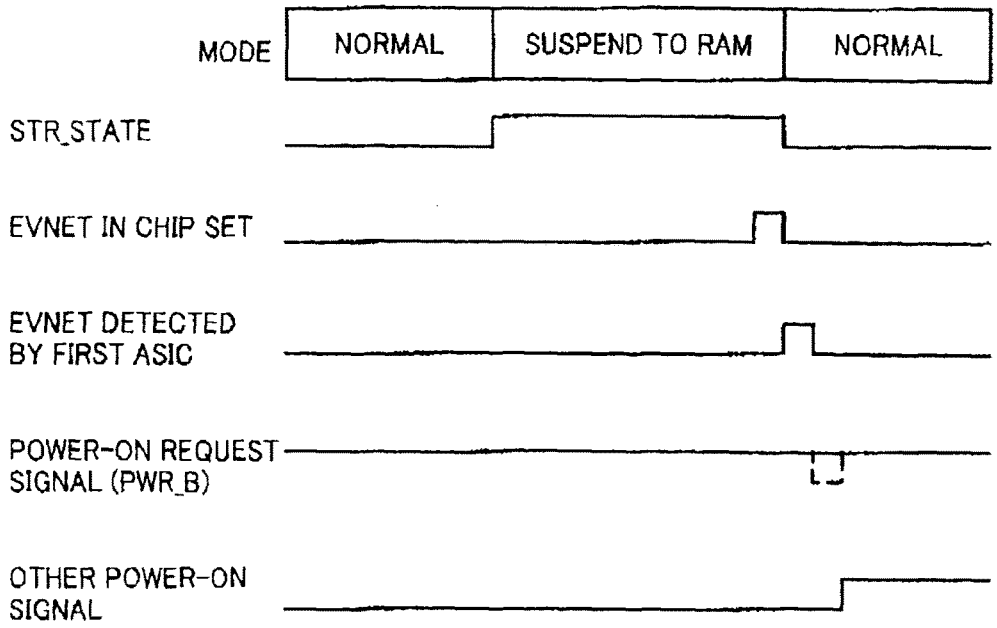
FIG. 5 is a view illustrating sequences of signals when a chip set detects a recovery event during an energy-saving mode.

FIG. 5 is a view illustrating sequences of signals when the chip set 24 detects a recovery event during the energy-saving mode.

The recovery event detected by the chip set 24 during the energy-saving mode is detected by the first ASIC 25 based on the signal output from the chip set 24. Because the recovery event is already detected by the chip set 24, the first ASIC 25 does not output the power-on request signal (the PWR_B signal) to the chip set 24, but instead outputs power-on signals for supplying power to the circuits in the chip set 24 which are turned off.

Figure 6:
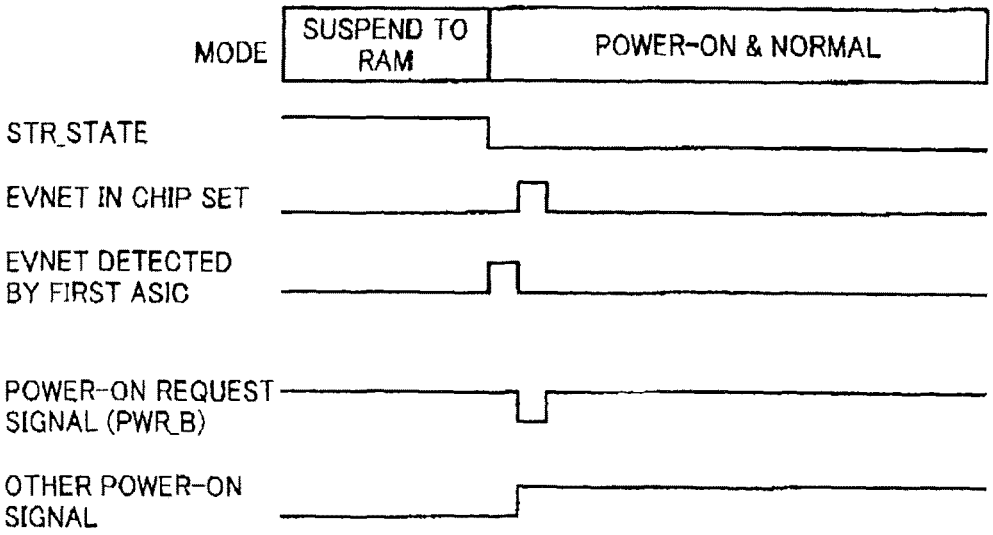
FIG. 6 is a view illustrating sequences of signals when a first ASIC detects a recovery event during the energy-saving mode.

FIG. 6 is a view illustrating sequences of signals when the first ASIC 25 detects a recovery event during the energy-saving mode.

When detecting the recovery event, the first ASIC 25 outputs the power-on request signal (the PWR_B signal) to the chip set 24. The PWR_B signal is then detected by the chip set 24 so that the chip set 24 causes power to be supplied thereto. At the same time, the first ASIC 25 outputs other power-on signals to cause power to be supplied to the circuits in the chip set 24 which are turned off.

The power-on request signal (PWR_B signal) to be output by detecting the recovery event is controlled by the power-on request signal control circuit 211 in the second illustrative embodiment. Such a signal is controlled by the second CPU 311 in the third illustrative embodiment.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the spirit and scope of the present invention, and all such modifications as would be obvious to one skilled in the art are intended to be included within the scope of the following claims.

The number of constituent elements, locations, shapes and so forth of the constituent elements are not limited to any of the structure for performing the methodology illustrated in the drawings.

What is claimed is:

1. An image processing device comprising:

a first [control unit] *controller* to control a normal operating mode during which image processing is performed;

a second [control unit] *controller* to control an energy-saving mode during which power consumption is lower than during the normal operating mode*, the second controller to output a control signal*;

[an interrupt request receiver connected to an external device to receive an interrupt request from the external device;

interrupt factor distributors to distribute the interrupt request received by the interrupt request receiver based on whether or not the interrupt request includes a predetermined interrupt factor;

interrupt request notification units to notify the second control unit as well as the first control unit of the interrupt request in accordance with distribution results from the interrupt factor distributors;

job adjustors to control transfer of a job between the first control unit and the second control unit based on notification from the interrupt request notification units;]

a detector to detect a power recovery factor;

a [measuring unit] *third controller that includes a timer* to measure a time for the energy-saving mode*, the third controller being separate from the first controller and the second controller, the third controller receiving the control signal output from the second controller and turning on the first controller in response to the control signal output from the second controller*;

a power supply [unit] to supply power to the first [control unit when the time measured by the measuring unit reaches a predetermined period of time] *controller*; and a status [notification unit] *notifier* to notify the detector of a status of the first [control unit] *controller* to which power is supplied from the power supply [unit], wherein [an operating mode of] *when* the image processing device is [changed from] *in* the energy-saving mode *and a power recovery factor is detected by the detector or a predetermined period of time measured by the*

*timer has expired, the power supply supplies power to the first controller, the status notifier notifies a status to the second controller to which power is supplied from the power supply, and the image processing device changes* to the normal operating mode [based on the power recovery factor detected by the detector].

[2. The image processing device according to claim 1, wherein the predetermined interrupt factor is stored in a register.]

3. The image processing device according to claim [2] *1*, wherein each of the first [control unit] *controller* and the second [control unit] *controller* comprises [the] *a* register.

4. The image processing device according to claim 1, further comprising:

a request signal [control unit] *controller* to control whether or not the operating mode of the image processing device is changed to the normal operating mode based on the power recovery factor detected by the detector; and a request signal generator to generate a power-on request signal to change the operating mode of the image processing device to the normal operating mode using the request signal [control unit] *controller*.

5. The image processing device according to claim 4, wherein the request signal [control unit] *controller* comprises a register to prevent the operating mode of the image processing device from being changed to the [normal operating] *energy saving* mode *again* from the [energy-saving] *normal operating* mode while the power supply [unit] supplies power to the first [control unit] *controller*.

[6. An image processing method for an image processing device comprising a first control unit to control a normal operating mode during which image processing is performed and a second control unit to control an energy-saving mode during which power consumption is lower than during the normal operating mode, the image processing method comprising:

receiving an interrupt request from an external device connected to the image processing device;

distributing the interrupt request based on whether or not the interrupt request includes a predetermined interrupt factor;

notifying the second control unit as well as the first control unit of the interrupt request in accordance with distribution results obtained by the distributing the interrupt request;

controlling transfer of a job between the first control unit and the second control unit based on notification from the notifying;

detecting a power recovery factor;

measuring a time for the energy-saving mode;

supplying power to the first control unit when the time measured by the measuring reaches a predetermined period of time; and notifying a status of the first control unit to which power is supplied, wherein an operating mode of the image processing device is changed from the energy-saving mode to the normal operating mode based on the power recovery factor.]

[7. The image processing method according to claim 6, wherein the predetermined interrupt factor is stored in a register.]

[8. The image processing method according to claim 7, wherein each of the first control unit and the second control unit comprises the register.]

[9. The image processing method according to claim 6, further comprising:

controlling whether or not the operating mode of the image processing device is changed to the normal operating mode based on the power recovery factor; and generating a power-on request signal to change the operating mode of the image processing device to the normal operating mode.]

[10. The image processing device according to claim 9, wherein the controlling comprises a register to prevent the operating mode of the image processing device from being changed to the normal operating mode from the energy-saving mode while power is supplied to the first control unit.]

11. A recording medium storing an image processing program *for causing a method to be executed, the image processing program* comprising modules that [causes] *cause* an image processing device comprising a first [control unit] *controller* to control a normal operating mode during which image processing is performed [and], a second [control unit] *controller* to control an energy-saving mode during which power consumption is lower than during the normal operating mode to execute an image processing [method] *and to output a control signal, and a third controller to measure a time for the energy-saving mode*, the [image processing] method comprising:

[receiving an interrupt request from an external device connected to the image processing device;

distributing the interrupt request based on whether or not the interrupt request includes a predetermined interrupt factor;

notifying the second control unit as well as the first control unit of the interrupt request in accordance with distribution results obtained by the distributing the interrupt request;

controlling transfer of a job between the first control unit and the second control unit based on notification from the notifying,]

detecting a power recovery factor;

measuring a time for the energy-saving mode *using the third controller which is separate from the first controller and the second controller*;

supplying power to the first [control unit] *controller* when *the image processing device is in the energy-saving mode and* the time measured by the measuring reaches a predetermined period of time *or when the power recovery factor is detected, the third controller receives the control signal output from the second controller causing the third controller to turn on the first controller*; and notifying a status of the first [control unit] *controller* to which power is supplied *when the image processing device is in the energy-saving mode and the time measured by the measuring reaches a predetermined period of time or when the power recovery factor is detected*, and an operating mode of the image processing device is changed from the energy-saving mode to the normal operating mode [based on the power recovery factor] *when the image processing device is in the energy-saving mode and the time measured by the measuring reaches a predetermined period of time or when the power recovery factor is detected*.

[12. The recording medium according to claim 11, wherein the predetermined interrupt factor is stored in a register.]

13. The recording medium according to claim [12] *11*, wherein each of the first [control unit] *controller* and the second [control unit] *controller* comprises [the] *a* register.

14. The recording medium according to claim 11, wherein the image processing method further comprising:

controlling whether or not the operating mode of the image processing device is changed to the normal operating mode based on the power recovery factor; and generating a power-on request signal to change the operating mode of the image processing device to the normal operating mode.

15. The recording medium according to claim 14, wherein the controlling comprises

*using* a register to prevent the operating mode of the image processing device from being changed to the [normal operating] *energy-saving* mode *again* from the [energy-saving] *normal operating* mode while power is supplied to the first [control unit] *controller*.

* * * * *